(12) United States Patent
Carlisle

(10) Patent No.: US 9,051,850 B2
(45) Date of Patent: Jun. 9, 2015

(54) SUPPORT STRUCTURE FORMING METHOD

(75) Inventor: Michael L. Carlisle, Derby (GB)

(73) Assignee: ROLLS-ROYCE plc, London (GB)

( * ) Notice: Subject to any disclaimer, the term of this patent is extended or adjusted under 35 U.S.C. 154(b) by 515 days.

(21) Appl. No.: 13/485,232

(22) Filed: May 31, 2012

(65) Prior Publication Data

US 2012/0321459 A1  Dec. 20, 2012

(30) Foreign Application Priority Data

Jun. 20, 2011 (GB) .................................. 1110349.6

(51) Int. Cl.
*F01D 25/28* (2006.01)

(52) U.S. Cl.
CPC ............ *F01D 25/28* (2013.01); *F05D 2230/20* (2013.01); *F05D 2230/53* (2013.01); *F05D 2250/232* (2013.01)

(58) Field of Classification Search
CPC ....... F01D 25/26; F01D 25/28; F04D 29/322; F05D 2230/53; F05D 2230/20; F05D 2250/232
USPC ................. 415/213.1, 220; 29/889.2, 889.21, 29/889.22
See application file for complete search history.

(56) References Cited

U.S. PATENT DOCUMENTS 8,397,383 B2 * 3/2013 Barnett et al. ............... 29/889.2

FOREIGN PATENT DOCUMENTS

| EP | 0 051 121 A1 | 5/1982 |
|---|---|---|
| RU | 2 121 406 C1 | 11/1998 |
| SU | 829262 | 5/1981 |

OTHER PUBLICATIONS

Jun. 29, 2011 Search Report issued in British Application No. GB1110349.6.

* cited by examiner

*Primary Examiner* — Edward Look
*Assistant Examiner* — Christopher J Hargitt
(74) *Attorney, Agent, or Firm* — Oliff PLC

(57) ABSTRACT

A method of forming an annular support structure for fastening a component of a gas turbine engine to a static part of the engine is provided. The support structure has a substantially frustoconical skin portion which, in use, extends inwardly from the static part. The support structure further has a flange portion which extends inwardly from an inner edge of the skin portion. In use, a mating flange extending outwardly from the component is attached to the flange portion. The flange portion has an engagement face against which a corresponding face of the mating flange is secured. The flange portion further has an inwardly-facing land at an outer edge of the engagement face which restrains the component against radial movement.

8 Claims, 2 Drawing Sheets

SUPPORT STRUCTURE FORMING METHOD

The present invention relates to a method of forming an annular support structure for fastening a core engine component of a gas turbine engine to a casing of the core engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14, where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The core engine components, comprising the intermediate pressure compressor 13, high-pressure compressor 14, combustion equipment 15, high-pressure turbine 16, intermediate pressure turbine 17, and low-pressure turbine 18, are surrounded by a casing or casings 24.

Casings typically include a one or more skin-and-flange, annular support structures for fastening the core engine components to the casing. FIG. 2 shows, for example, a longitudinal cross-section of the high-pressure compressor 25 and respective casing 26 of a Rolls-Royce Trent 1000 engine. Support structures in the form of front 27 and rear 28 support cones attach the compressor to the casing. The support cones have frustoconical skin portions 27a, 28a extending inwardly from the casing. These terminate at respective flange portions 27b, 28b. Matching flanges 29, 30 extending outwardly from the compressor are then attached to the flange portions by bolts which penetrate through each flange portion and flange pair.

FIG. 3 shows a close-up view of the attachment of the rear support cone 28 to the matching compressor flange 30. For clarity, the bolts and bolt holes are not shown, in many instances the flange portion 28b minimum thickness requirement is larger than the skin portion 28a minimum thickness requirement. In particular, it is not desirable to oversize the skin thickness to match the flange thickness, as this would unnecessarily increase the weight of the support structure. Thus a change of section thickness occurs between the skin portion and the flange portion. However, many support structures also have to incorporate a land 31 or similar restraining feature to provide concentricity to the attaching component. It is usual to manufacture the support structure by forging and finish machining to the correct final dimensions. The land can therefore be produced by over-sizing the as-forged thickness of the flange portion, which can then be partially machined back to produce the land as well as a final flange portion thickness. However, this is a high cost method of manufacture, with high material input weights and poor material utilisation in the flange portion region.

Typically, the skin portion 28a may have a thickness (A) of 2-3 mm, compared with a flange portion 28b thickness (B) of 4-5 mm. Further, the matching flange 30 may have a thickness (C) of 3-4 mm, requiring the land 31 to have a similar axial extent. Thus, to produce the land, nearly 50% of the oversized as-forged flange portion must be machined away, as indicated by the hatched area in FIG. 3.

It would thus be desirable to provide an alternative method of forming such support structures, which method is less costly to perform and less wasteful of material.

The present invention is at least partly based on the realisation that flow-forming is a suitable method for forming these support structures.

Accordingly, a first aspect of the present invention provides a method of forming an annular support structure for fastening a component of a gas turbine engine to a static part of the engine, the support structure having:

a substantially frustoconical skin portion which, in use, extends inwardly from the static part; and a flange portion which extends inwardly from an inner edge of the skin portion, and to which, in use, is attached a mating flange extending outwardly from the component, the flange portion having an engagement face against which a corresponding face of the mating flange is secured, and the flange portion further having an inwardly-facing land at an outer edge of the engagement face which restrains the component against radial movement;

wherein the method includes the steps of:

providing a blank;

flow-forming the blank over a mandrel into a near net-shape of the support structure; and removing excess material from the near net-shape to form the land and finish the support structure.

Advantageously, flow-forming can be performed significantly more cheaply than forging, and further allows significant savings in material wastage.

The method may have any one or, to the extent that they are compatible, any combination of the following optional features.

The excess material may be removed by machining. This allows the land and engagement face to be formed in way that conforms closely to the shape of the mating flange. However, advantageously, material may only need to be removed from positions close to the final surface of the land, rather than across the entire engagement face of the flange portion.

Typically, the method further includes the formation of fastening holes in the flange portion, e.g. to accept fastening bolts.

The blank is typically an annular disc before the flow-forming step.

The flow-forming step preferably results in the flange portion of the near net-shape having substantially the thicknesses of the flange portion of the finished support structure. In this way, extensive subsequent machining of the flange portion can be avoided.

Additionally or alternatively, the flow-forming step preferably results in the skin portion of the near net-shape having substantially the thicknesses of the skin portion of the finished support structure.

The land may extend between the engagement face and an inner surface of the skin portion.

Preferably, the flow-formed near net-shape has excess material radially outwardly of the flange portion, which excess material is removed in the removing step. Providing excess material in this position can help to maintain a suitable thickness ratio of the skin portion to the flange portion for flow-forming, and can allow the land to be appropriately positioned.

The static part of the engine can be a casing or bearing housing. The component can be a core engine component, bearing or seal. For example, the support structure may be a compressor or turbine section support cone, the static part being a casing for the compressor or turbine section. In another example, the support structure may be a seal support cone, the static part being a casing or bearing housing and the component being a bearing or seal. Compressor or turbine section support cones generally provide support between a static casing and a static core engine component, while seal support cone generally provide support between a static casing or bearing housing and a rotating bearing or seal.

A second aspect of the present invention provides a support structure formed by the method of the first aspect.

Embodiments of the invention will now be described by way of example with reference to the accompanying drawings in which.

Flow-forming is an incremental metal forming technique known to the skilled person in which a blank is formed under pressure over a mandrel by rollers. The technique provides an alternative approach for forming annular support structures for fastening components to an engine casing. In particular, it can provide improved material utilisation and lower material input weights.

However, flow-forming is not usually suitable for producing articles with large changes in section thickness. Thus, the forged support cone shown in FIG. 3, with its change in section thickness from 2-3 mm to 7-9 mm where the skin portion 28a joins the flange portion 28b (giving a flange to skin thickness ratio of about 3.5:1), requires alteration if it is to be produced by flow-forming.

Figure 1:
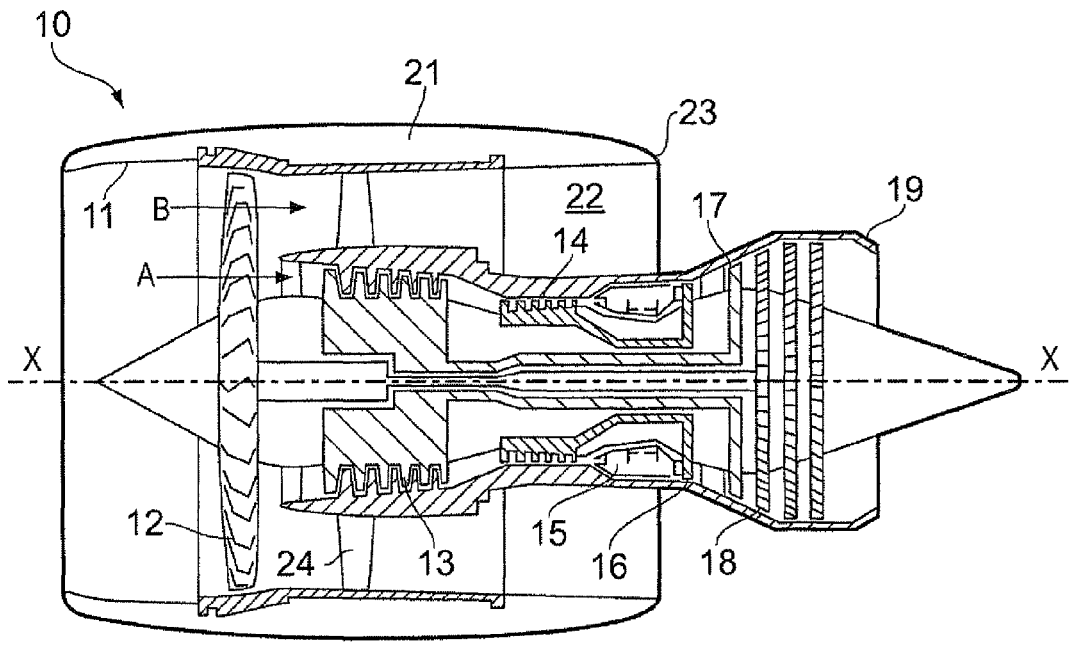
FIG. 1 shows a longitudinal cross-section through a ducted fan gas turbine engine.
Figure 2:
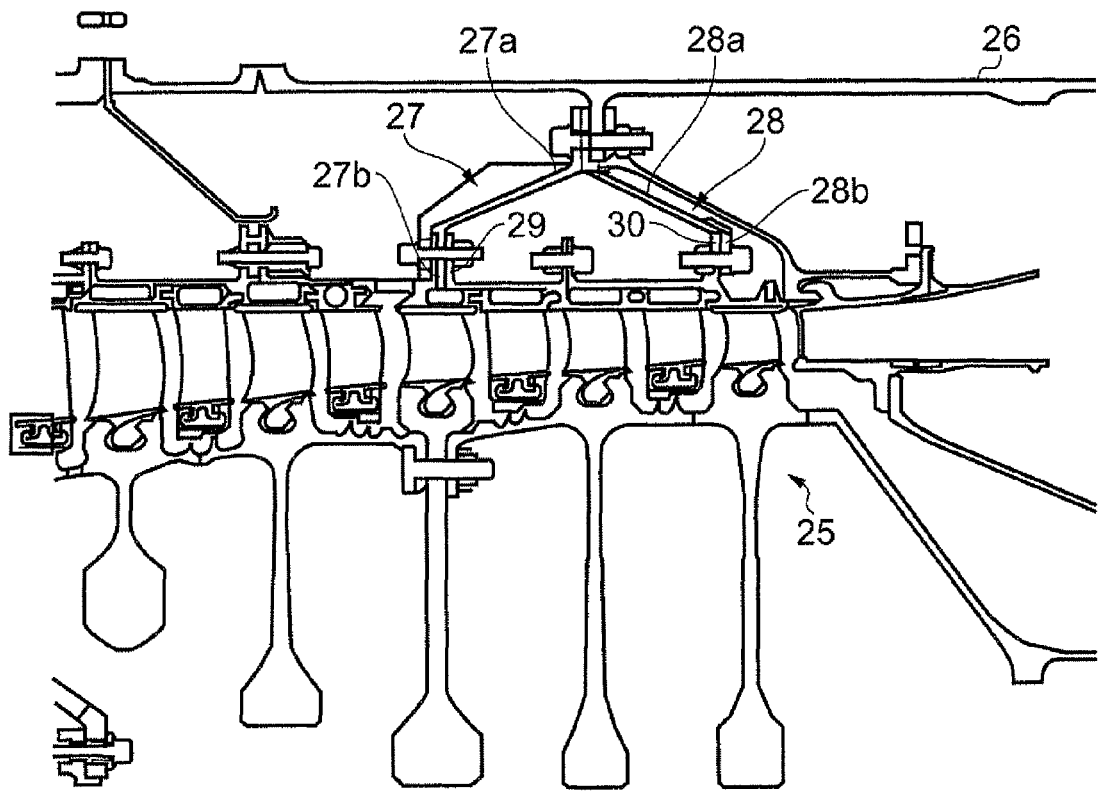
FIG. 2 shows a longitudinal cross-section of the high-pressure compressor and casing of a gas turbine engine.
Figure 3:
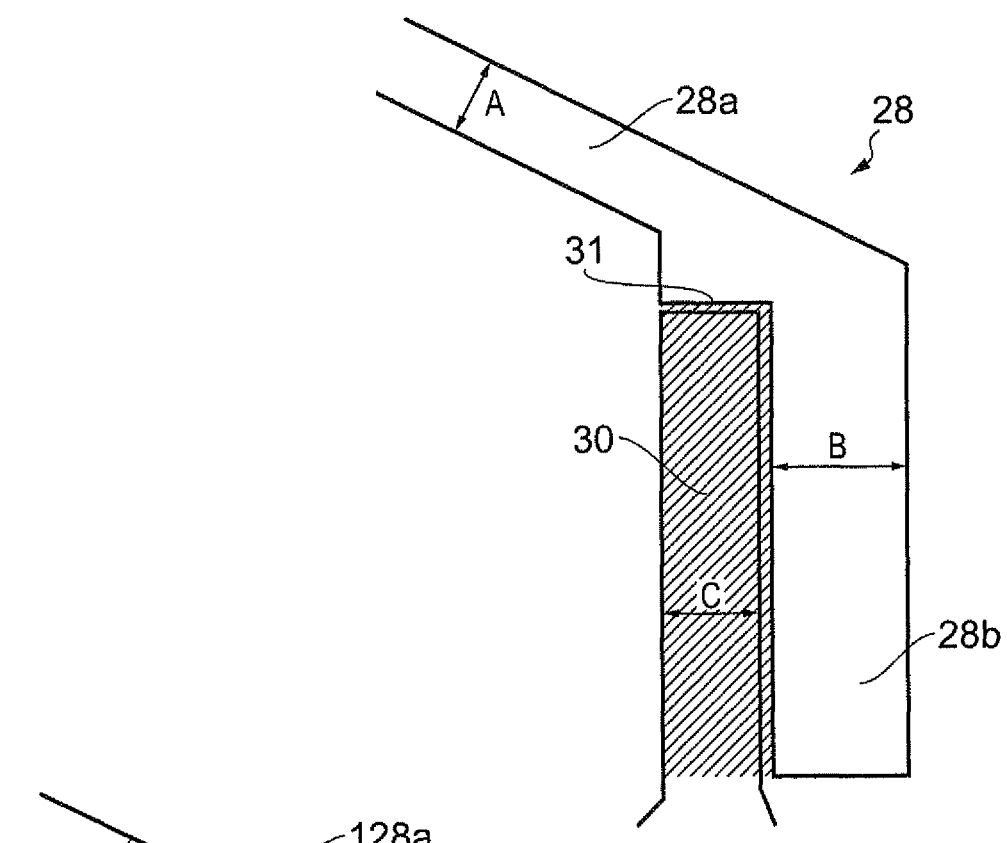
FIG. 3 shows a close-up view of the attachment of a rear support cone to a matching compressor flange.
Figure 4:
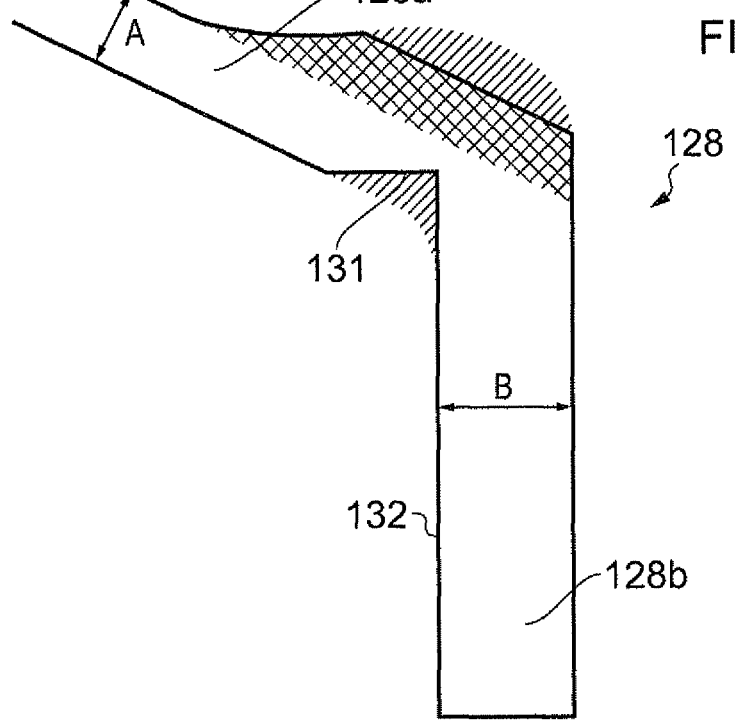
FIG. 4 shows a close-up view of a rear support cone formed according to the present invention.

In particular, in order to produce an acceptable change in section thickness and a restraining land, much of the excess material indicated by the hatched area in FIG. 3 is absent in the near net-shape produced after flow-forming, while, counter-intuitively, additional material is added radially outwardly of the flange portion. FIG. 4 shows a close-up view of a rear support cone 128 produced by flow-forming an annular disc-shaped blank, the view corresponding to that of FIG. 3. The cone has a skin portion 128a and a flange portion 128b. A face of a mating compressor flange (not shown in FIG. 4) is secured, in use, against an engagement face 132 of the flange portion by fastening bolts (also not shown) passing through the flange portion and the mating flange. A land 131 extending between the engagement face and an inner surface of the skin portion restrains the compressor against radial movement.

The skin portion 128a and the flange portion 128b have similar respective thicknesses (A and B) to that of the post-machined forged support cone of FIG. 3. In particular, an acceptable flange to skin thickness ratio for flow-forming of about 1.7:1 can be obtained.

In FIG. 4, additional material which is added radially outwardly of the flange portion and which remains after final machining of the near net-shape is indicated by cross-hatching. The main regions of material which require removal from the near net-shape are (i) a region adjacent where the land 131 is formed and (ii) a region radially outwards of the flange portion 128b, the regions being indicated by hatching in FIG. 4 (some further material removal may also be required, e.g. to produce holes for the passage of the fastening bolts). Significantly, the overall amount of material to be removed from the near net-shape produced by flow-forming is much less than has to be removed from the forged support cone. Notably, most of the radial extent of the flange portion 128b already has its final thickness after flow-forming, and requires little finishing. Likewise, the skin portion 128a also has its final thickness after flow-forming.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of forming an annular support structure for fastening a component of a gas turbine engine to a static part of the engine, the support structure having:
   a substantially frustoconical skin portion which, in use, extends inwardly from the static part; and
   a flange portion which extends inwardly from an inner edge of the skin portion, and to which, in use, is attached a mating flange extending outwardly from the component, the flange portion having an engagement face against which a corresponding face of the mating flange is secured, and the flange portion further having an inwardly-facing land at an outer edge of the engagement face which restrains the component against radial movement,
   the method comprising:
   providing a blank;
   flow-forming the blank over a mandrel into a near net-shape of the support structure; and
   removing excess material from the near net-shape to form the land and finish the support structure.

2. A method according to claim 1, wherein the flow-forming step results in the flange portion of the near net-shape having substantially the thicknesses of the flange portion of the finished support structure.

3. A method according to claim 1, wherein the flow-forming step results in the skin portion of the near net-shape having substantially the thicknesses of the skin portion of the finished support structure.

4. A method according to claim 1 wherein the land extends between the engagement face and an inner surface of the skin portion.

5. A method according to claim 1 wherein the flow-formed near net-shape has excess material radially outwardly of the flange portion, which excess material is removed in the removing step.

6. A method according to claim 1 wherein the support structure is a compressor or turbine section support cone.

7. A method according to claim 1 wherein the support structure is a seal support cone.

8. A support structure formed by the method of claim 1.

* * * * *